(12) United States Patent
Harsia et al.

(10) Patent No.: US 9,777,464 B2
(45) Date of Patent: Oct. 3, 2017

(54) VARIABLE LOAD SENSE OPEN CENTER HYBRID SYSTEM

(71) Applicant: Parker-Hannifin Corporation, Cleveland, OH (US)

(72) Inventors: Jarmo Harsia, Woodstock, IL (US); Patrick Stegemann, Arlington Heights, IL (US)

(73) Assignee: Parker-Hannifin Corporation, Cleveland, OH (US)

(*) Notice: Subject to any disclaimer, the term of this patent is extended or adjusted under 35 U.S.C. 154(b) by 82 days.

(21) Appl. No.: 14/767,811

(22) PCT Filed: Feb. 18, 2014

(86) PCT No.: PCT/US2014/016902
§ 371 (c)(1),
(2) Date: Aug. 13, 2015

(87) PCT Pub. No.: WO2014/127356
PCT Pub. Date: Aug. 21, 2014

(65) Prior Publication Data
US 2016/0002888 A1     Jan. 7, 2016

Related U.S. Application Data

(60) Provisional application No. 61/834,186, filed on Jun. 12, 2013, provisional application No. 61/765,231, filed on Feb. 15, 2013.

(51) Int. Cl.
*E02F 9/22*     (2006.01)
*G05D 7/01*     (2006.01)
(Continued)

(52) U.S. Cl.
CPC .......... *E02F 9/2235* (2013.01); *E02F 9/2225* (2013.01); *E02F 9/2232* (2013.01);
(Continued)

(58) Field of Classification Search
CPC ........... F04B 49/22; F15B 11/165; G05D 7/01
See application file for complete search history.

(56) References Cited

U.S. PATENT DOCUMENTS

| | | | | |
|---|---|---|---|---|
| 3,788,773 A | * | 1/1974 | Van der Kolk | F04B 49/002 417/213 |
| 4,030,623 A | | 6/1977 | Bridwell et al. | |

(Continued)

OTHER PUBLICATIONS

Reid B: "Hydraulik Fuer Minibagger", O + P Olhydraulik Und Pneumatik, Vereinigte Fachverlage, Mainz, DE, vol. 41, No. 4, Jan. 1, 1997 (Jan. 1, 1997), pp. 252, 255-258,26, XP000196966, ISSN: 0341-2660 figure 6.

(Continued)

*Primary Examiner* — Craig Schneider
*Assistant Examiner* — Kevin Barss
(74) *Attorney, Agent, or Firm* — Renner, Otto, Boisselle & Sklar, LLP

(57) ABSTRACT

A load sense open center hydraulic system provides efficiency and operator feedback and includes one or more constant flow-open center valves (218); respective one or more parallel power cores (238) operatively coupled to the one or more constant flow-open center valves; a variable capacity pump (246) directly fluidly connected to the one or more parallel power cores; and a pressure compensated flow control fluidly connected between the variable capacity pump and the one or more constant flow-open center valves. The one or more constant flow-open center valves are not fluidly coupled to a fixed capacity pump.

17 Claims, 8 Drawing Sheets

(51) Int. Cl.
  *F15B 11/16* (2006.01)
  *F04B 49/22* (2006.01)

(52) U.S. Cl.
  CPC .......... *E02F 9/2246* (2013.01); *E02F 9/2296* (2013.01); *F04B 49/22* (2013.01); *F15B 11/165* (2013.01); *G05D 7/01* (2013.01); *F15B 2211/20546* (2013.01); *F15B 2211/20553* (2013.01); *F15B 2211/253* (2013.01); *F15B 2211/40507* (2013.01); *F15B 2211/40515* (2013.01); *F15B 2211/40553* (2013.01); *F15B 2211/41509* (2013.01); *F15B 2211/45* (2013.01); *F15B 2211/652* (2013.01)

(56) References Cited

U.S. PATENT DOCUMENTS

| | | | |
|---|---|---|---|
| 5,333,449 | A | 8/1994 | Takahashi et al. |
| 5,528,911 | A | 6/1996 | Roth et al. |
| 5,546,750 | A | 8/1996 | Richer |
| 5,567,123 | A | 10/1996 | Childress et al. |
| 5,647,211 | A * | 7/1997 | Harber .................. E02F 9/2253 60/484 |
| 6,244,158 | B1 * | 6/2001 | Roche .................. F15B 11/044 91/446 |
| 6,450,194 | B1 * | 9/2002 | Wasson ............... F15B 13/0402 137/351 |
| 6,648,576 | B1 * | 11/2003 | Duell ...................... B65F 3/046 414/408 |
| 7,487,707 | B2 * | 2/2009 | Pfaff ...................... F15B 11/003 91/437 |
| 7,581,392 | B2 * | 9/2009 | Jeon ...................... B62D 11/005 60/421 |
| 2009/0025380 | A1 | 1/2009 | Harsia |
| 2009/0158728 | A1 * | 6/2009 | Harsia ....................... B66F 9/22 60/484 |
| 2009/0308068 | A1 * | 12/2009 | Yoshino ................ E02F 9/2203 60/468 |

OTHER PUBLICATIONS

International Search Report and Written Opinion for corresponding Patent Application No. PCT/US2014/006902 dated Jun. 12, 2014.
Written Opinion for corresponding Patent Application No. PCT/US2014/006902 dated Apr. 21, 2015.
International Preliminary Report on Patentability for corresponding Patent Application No. PCT/US2014/006902 dated Jun. 22, 2015.

* cited by examiner

VARIABLE LOAD SENSE OPEN CENTER HYBRID SYSTEM

RELATED APPLICATIONS

This application is a national phase of International Application No. PCT/US2014/016902 filed on Feb. 18, 2014 and published in the English language, which claims the benefit of U.S. Provisional Application No. 61/765,231 filed Feb. 15, 2013, the disclosures of each are hereby incorporated herein by reference.

FIELD OF INVENTION

The present invention relates to hydraulic valve systems used, for example, in off-road earth moving, construction, and forestry equipment, such as backhoes, log loaders, feller bunchers, wheel loaders, and the like. Hydraulic valve systems are utilized, for example, to cause cylinders to move a boom or bucket loader in a backhoe. The present invention relates to an improved design for such hydraulic valve systems, and more particularly to an efficient open center hydraulic system with feedback.

BACKGROUND

Open center hydraulic circuits use pumps which supply a continuous flow. The flow is returned to tank through a control valve's open center; that is, when the control valve spool is centered, it provides an open return path to tank and the fluid is not pumped to a high pressure. Otherwise, if the control valve is actuated, it routes fluid to and from an actuator and tank. The fluid's pressure will rise to meet any resistance, because the pump has a constant output. If the pressure rises too high, fluid returns to tank through a pressure relief valve. Multiple control valves may be stacked in series. This type of circuit typically uses inexpensive, constant displacement pumps.

SUMMARY OF INVENTION

The major downside of a constant-flow, open-center system is energy efficiency. Because the pump is fixed, the whole pump flow is always pressurized at the highest function pressure. Throttling losses in the valve, especially at low flow demand (i.e. during slow movements), can be substantial. Competing load sense technology uses variable pumps to adjust the pump flow to function demand, but loses the pressure dependency of the speed of the movement, and therefore the operator does not get any feedback on the forces at the implement being commanded.

The present invention takes the advantages of both prior art systems and combines them.

According to one aspect of the invention an open center hydraulic system includes one or more constant-flow, open center valves; a parallel power core operatively coupled to the one or more constant-flow, open center valves; a variable capacity pump fluidly connected to and configured to provide pressurized fluid to the one or more constant-flow, open center valves, and fluidly connected to the parallel power core; and a flow restrictor fluidly connected between the variable capacity pump and the one or more constant-flow, open center valves.

Optionally, the variable capacity pump is directly fluidly connected to the parallel power core.

Optionally, the flow restrictor is a pressure compensated flow control fluidly connected between the variable capacity pump and the one or more constant-flow, open center valves.

Optionally, the one or more constant-flow, open center valves include a plurality of serially connected constant-flow, open center valves.

Optionally, the one or more constant-flow, open center valves are not fluidly coupled to a fixed capacity pump.

Optionally, the pump is a load-sense pump.

Optionally, the pump is set up as a remote pressure control pump.

Optionally, the flow restrictor is a fixed metering device.

Optionally, the flow restrictor is a variable metering device.

Optionally, at least one of the one or more constant-flow, open center valves includes a valve spool having notches configured to create a flow restriction thereat such that the pressure in the open center passageway increases with spool stroke.

Optionally, at least one of the one or more constant-flow, open center valves includes a valve spool which has associated therewith: (A) a first hydraulic port and a second hydraulic port; (B) a first spool passage between the parallel power core and a first hydraulic port associated with the spool, that is capable of being opened or closed depending upon the position of the spool; (C) a second spool passage between the parallel power core and a second hydraulic port associated with the spool, that is capable of being opened or closed depending upon the position of the spool; (D) a third spool passage between a tank galley and the first hydraulic port associated with the spool, that is capable of being opened or closed depending upon the position of the spool; (E) a fourth spool passage between the tank galley and the second hydraulic port associated with the spool, that is capable of being opened or closed depending upon the position of the spool; (F) a fifth spool passage, wherein an open center core passes through the fifth spool passage, and wherein, depending upon the position of the spool, the spool may permit hydraulic fluid to flow through the fifth spool passage and the open center core in an unrestricted manner, or the spool may partially restrict the hydraulic fluid flowing through the fifth spool passage and the open center core.

Optionally, the spool has at least a neutral position, a first non-neutral position, and a second non-neutral position, wherein: (A) in the neutral position, the spool permits hydraulic fluid to flow through the fifth spool passage and the open center core passing therethrough in an unrestricted manner, and the spool blocks the flow of hydraulic fluid through the first spool passage, the second spool passage, the third spool passage, and the fourth spool passage, (B) in the first non-neutral position, the spool partially restricts the flow of hydraulic fluid through the fifth spool passage and the open center core passing therethrough, the spool opens the first spool passage between the power core and the first hydraulic port associated with the spool allowing hydraulic fluid to flow from the power core to the first hydraulic port, the spool opens the fourth spool passage between the tank galley and the second hydraulic port associated with the spool allowing hydraulic fluid to flow from the second hydraulic port to the tank galley, the spool closes the second spool passage between the power core and the second hydraulic port associated with the spool, and the spool closes the third spool passage between the tank galley and the first hydraulic port associated with the spool; and (C) in the second non-neutral position, the spool partially restricts the flow of hydraulic fluid through the fifth spool passage and the open center core passing therethrough, the spool opens the second spool passage between the power core and the second hydraulic port associated with the spool allowing hydraulic fluid to flow from the power core to the second hydraulic port, the spool opens the third spool passage between the tank galley and the first hydraulic port associated with the spool allowing hydraulic fluid to flow from the first hydraulic port to the tank galley, the spool closes the first spool passage between the power core and the first hydraulic port associated with the spool, and the spool closes the fourth spool passage between the tank galley and the second hydraulic port associated with the spool.

Optionally, each spool in each of the one or more valves has associated therewith a spool activator, wherein each of said spool activators is capable of causing movement of the spool associated therewith to either a neutral position, a first non-neutral position, or a second non-neutral position.

Optionally, the hydraulic system, further includes a signal port associated with the variable displacement pump, wherein an increase in hydraulic fluid pressure received by the signal port cause the variable displacement pump to pump hydraulic fluid at an increased pressure rate, and wherein a decrease in hydraulic fluid pressure received by the signal port causes the variable displacement pump to pump hydraulic fluid at a decreased pressure rate; a sense signal passage hydraulically connecting the open center core and the signal port, wherein the hydraulic connection between the sense signal passage and the open center core is located between the pump and the spool of the first one of the one or more valves downstream of the pump in the open center core; wherein when activation of one or more of the spools of one or more of the valves occurs in a manner causing one or more of the activated spools to be in either a first non-neutral position, or a second non-neutral position, increased hydraulic fluid pressure in the open center core is hydraulically communicated through the sense signal passage to the signal port.

According to another aspect of the invention, a valve assembly including a one or more constant-flow, open center valves; an open center valve input port; a parallel power core operatively coupled to the one or more constant-flow, open center valves; and a power core input port separate from the open center valve input port, wherein the parallel power core is not fluidly connected to an open center core of the open center valves downstream of the input ports.

Optionally, the valve assembly includes a variable capacity pump fluidly connected to the parallel power core input port and the open center valve input port.

Optionally, the variable capacity pump is directly fluidly connected to the parallel power core input port.

Optionally, the valve assembly includes a flow restrictor fluidly connected between the variable capacity pump and the one or more constant-flow, open center valves Optionally, the flow restrictor is a pressure compensated flow control fluidly connected between the variable capacity pump and the one or more constant-flow, open center valves.

Optionally, the one or more constant-flow, open center valves include a plurality of serially connected constant-flow, open center valves.

Optionally, the one or more constant-flow, open center valves are not fluidly coupled to a fixed capacity pump.

Optionally, the pump is a load-sense pump.

Optionally, the pump is set up as a remote pressure control pump.

Optionally, the flow restrictor is a fixed metering device.

Optionally, the flow restrictor is a variable metering device.

Optionally, at least one of the one or more constant-flow, open center valves includes a valve spool having notches configured to create a flow restriction thereat such that the pressure in the open center passageway increases with spool stroke.

Optionally, at least one of the one or more constant-flow, open center valves includes a valve spool having open center notches substantially smaller than power core notches.

Optionally, at least one of the one or more constant-flow, open center valves includes a valve spool which has associated therewith: (A) a first hydraulic port and a second hydraulic port; (B) a first spool passage between the parallel power core and a first hydraulic port associated with the spool, that is capable of being opened or closed depending upon the position of the spool; (C) a second spool passage between the parallel power core and a second hydraulic port associated with the spool, that is capable of being opened or closed depending upon the position of the spool; (D) a third spool passage between a tank galley and the first hydraulic port associated with the spool, that is capable of being opened or closed depending upon the position of the spool; (E) a fourth spool passage between the tank galley and the second hydraulic port associated with the spool, that is capable of being opened or closed depending upon the position of the spool; (F) a fifth spool passage, wherein an open center core passes through the fifth spool passage, and wherein, depending upon the position of the spool, the spool may permit hydraulic fluid to flow through the fifth spool passage and the open center core in an unrestricted manner, or the spool may partially restrict the hydraulic fluid flowing through the fifth spool passage and the open center core.

Optionally, the spool has at least a neutral position, a first non-neutral position, and a second non-neutral position, wherein: (A) in the neutral position, the spool permits hydraulic fluid to flow through the fifth spool passage and the open center core passing therethrough in an unrestricted manner, and the spool blocks the flow of hydraulic fluid through the first spool passage, the second spool passage, the third spool passage, and the fourth spool passage, (B) in the first non-neutral position, the spool partially restricts the flow of hydraulic fluid through the fifth spool passage and the open center core passing therethrough, the spool opens the first spool passage between the power core and the first hydraulic port associated with the spool allowing hydraulic fluid to flow from the power core to the first hydraulic port, the spool opens the fourth spool passage between the tank galley and the second hydraulic port associated with the spool allowing hydraulic fluid to flow from the second hydraulic port to the tank galley, the spool closes the second spool passage between the power core and the second hydraulic port associated with the spool, and the spool closes the third spool passage between the tank galley and the first hydraulic port associated with the spool; and (C) in the second non-neutral position, the spool partially restricts the flow of hydraulic fluid through the fifth spool passage and the open center core passing therethrough, the spool opens the second spool passage between the power core and the second hydraulic port associated with the spool allowing hydraulic fluid to flow from the power core to the second hydraulic port, the spool opens the third spool passage between the tank galley and the first hydraulic port associated with the spool allowing hydraulic fluid to flow from the first hydraulic port to the tank galley, the spool closes the first spool passage between the power core and the first hydraulic port associated with the spool, and the spool closes the fourth spool passage between the tank galley and the second hydraulic port associated with the spool.

Optionally, each spool in each of the one or more valves has associated therewith a spool activator, wherein each of said spool activators is capable of causing movement of the spool associated therewith to either a neutral position, a first non-neutral position, or a second non-neutral position.

Optionally, the valve assembly includes a signal port associated with the variable displacement pump, wherein an increase in hydraulic fluid pressure received by the signal port cause the variable displacement pump to pump hydraulic fluid at an increased pressure rate, and wherein a decrease in hydraulic fluid pressure received by the signal port causes the variable displacement pump to pump hydraulic fluid at a decreased pressure rate; a sense signal passage hydraulically connecting the open center core and the signal port, wherein the hydraulic connection between the sense signal passage and the open center core is located between the pump and the spool of the first one of the one or more valves downstream of the pump in the open center core; wherein when activation of one or more of the spools of one or more of the valves occurs in a manner causing one or more of the activated spools to be in either a first non-neutral position, or a second non-neutral position, increased hydraulic fluid pressure in the open center core is hydraulically communicated through the sense signal passage to the signal port.

The foregoing and other features of the invention are hereinafter described in greater detail with reference to the accompanying drawings.

DETAILED DESCRIPTION

Figure 1:
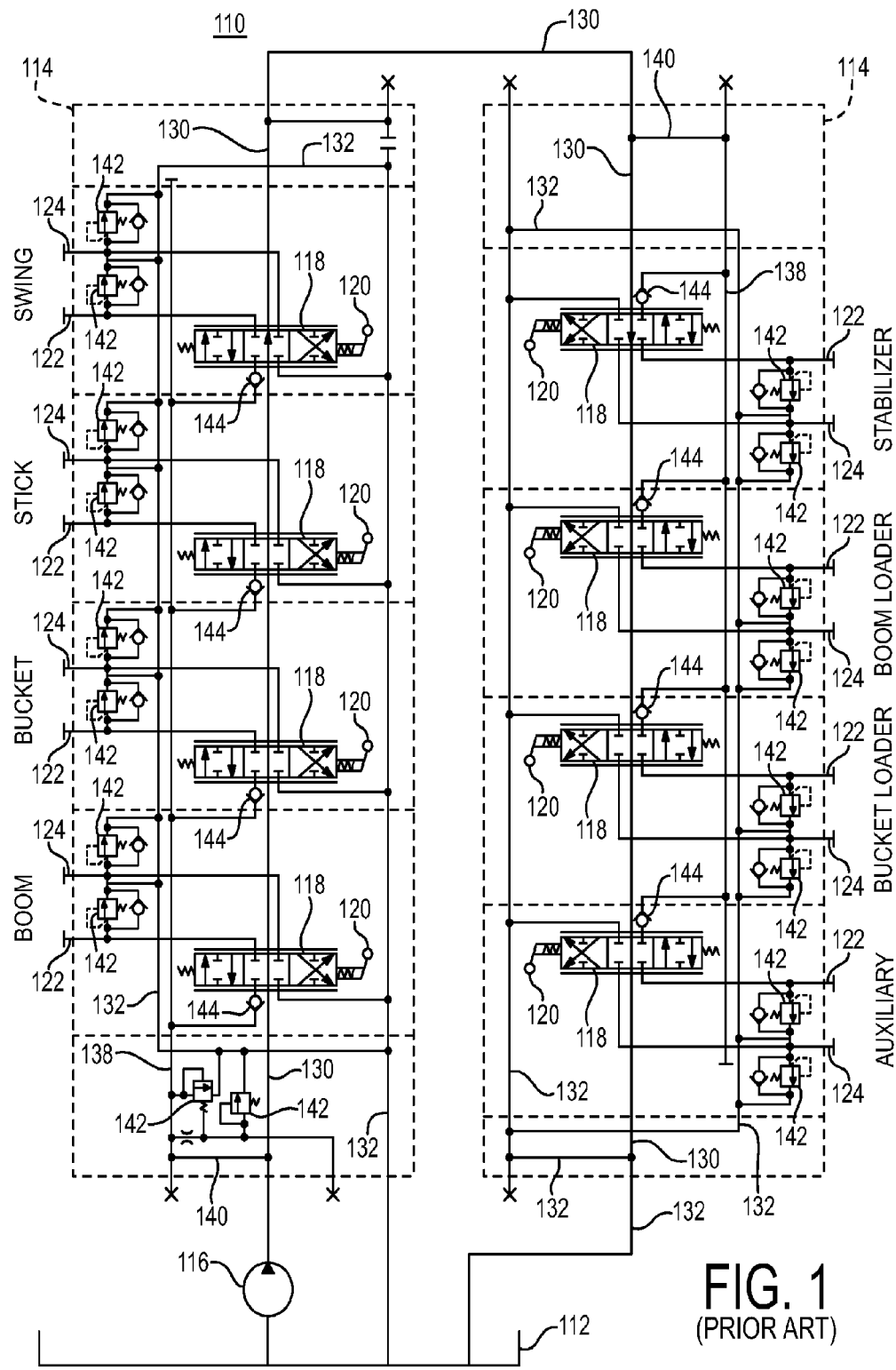
FIG. 1 is a schematic drawing of an embodiment of a conventional open center hydraulic valve system having two valves, eight spools, and eight functions corresponding to the spools.

Conventional open center hydraulic systems 110 include a fixed displacement pump connected to one or more constant-flow, open center (CFO) valve banks as depicted in FIG. 1 (see also U.S. Patent Application Publication 2009/0025380, the entire contents of which are hereby incorporated herein by reference). The open center hydraulic valve system 110 of FIG. 1 presently is in common use, for example, in off-road earth moving, construction, and forestry equipment. Major benefits of these systems are the low complexity valve technology, short response times to operator input and pressure dependent movement of functions, allowing the operator to get a better 'feel' for the forces at the implement.

While variations in the basic design of such an open center hydraulic valve system 110 exist, the fundamental components and operation of such a system are briefly described below.

The open center hydraulic valve system 110 of FIG. 1 typically includes a hydraulic fluid tank 112, one or more constant flow open center hydraulic valve banks ("valves") 114, and a fixed displacement pump 116. Each valve 114, in turn, may include one or more spools 118, with each spool 118 being activated by a spool actuator 120. The spool actuators 120 may be activated by an equipment operator using a number of known means (not illustrated), such as mechanically (for example, using a lever), electrically (for example, using a solenoid receiving an electrical signal from a switch, a joystick, a computer, or other means), hydraulically, pneumatically, or otherwise.

Figure 2A:
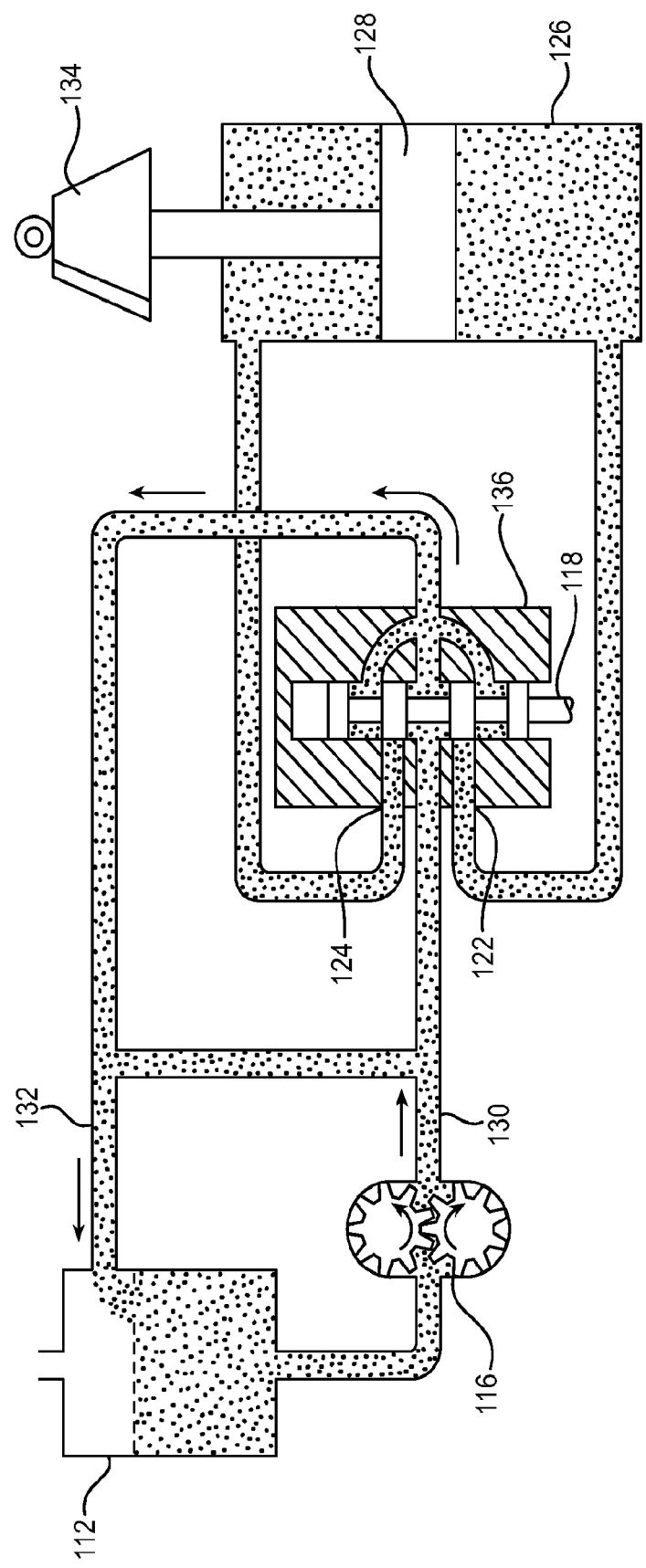
FIG. 2A is a cross-sectional view illustrating the operation of a spool of a conventional simple CFO valve in the neutral position.
Figure 2B:
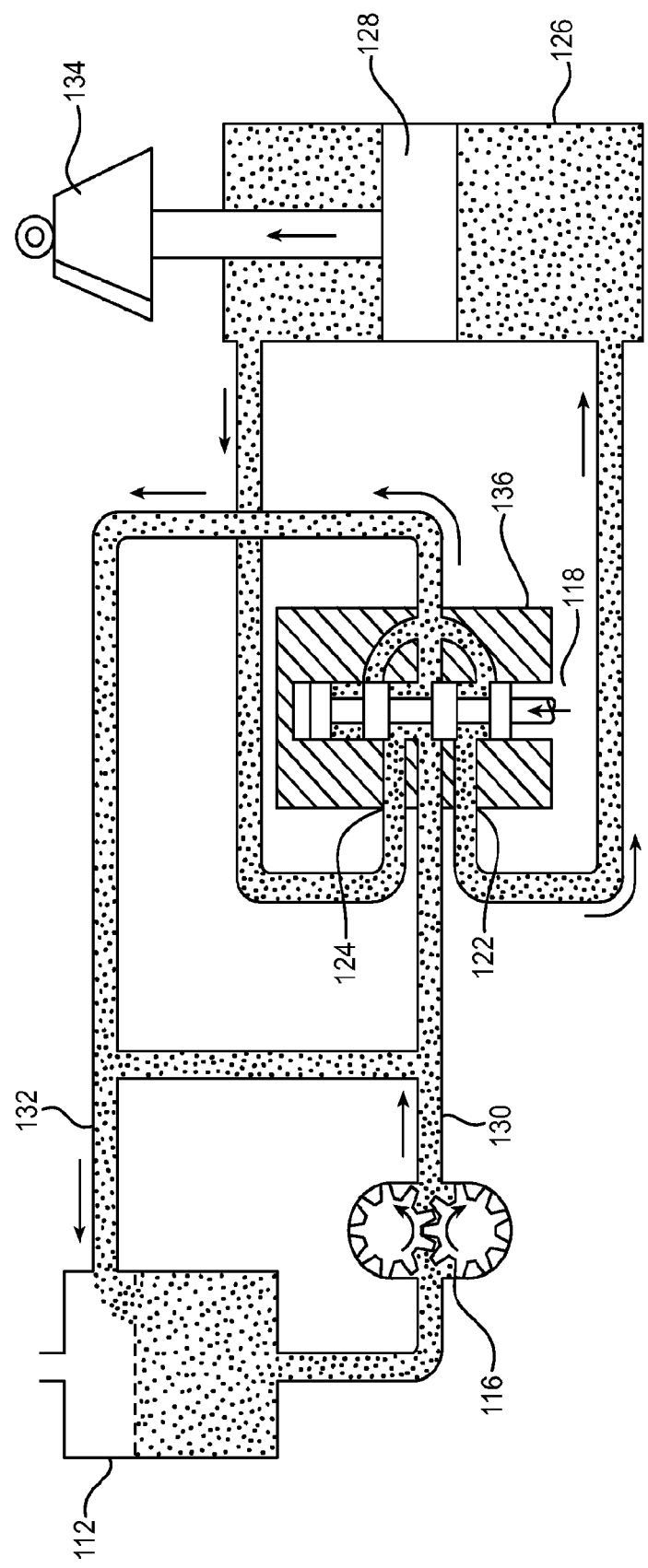
FIG. 2B is a cross-sectional view illustrating the operation of a spool of a conventional simple CFO valve activated in a non-neutral first position to lift a load.
Figure 2C:
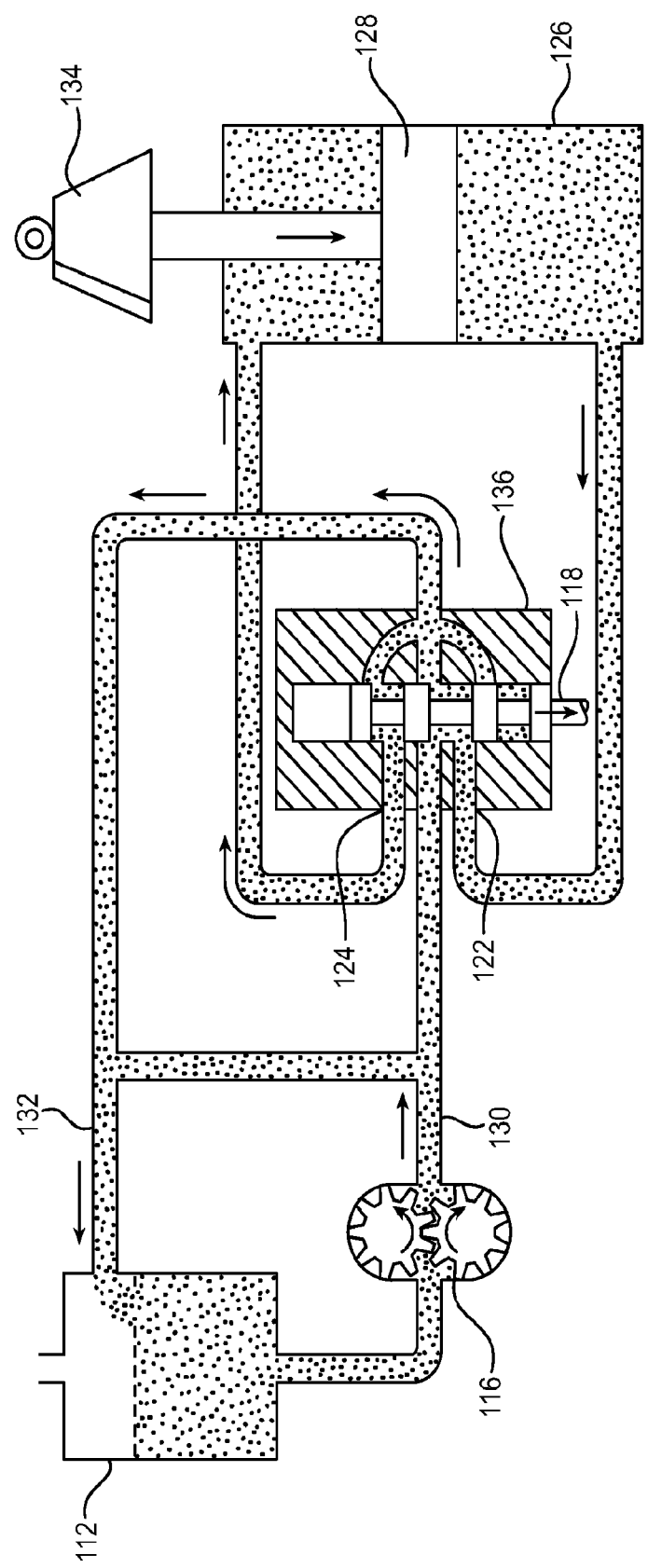
FIG. 2C is a cross-sectional view illustrating the operation of a spool of a conventional simple CFO valve activated in a non-neutral second position to lower a load.

In order to illustrate the operation of a spool 118 to selectively interconnect hydraulic pathways within a valve, a simplified set of drawings illustrating how a spool 118 of a simple constant flow open center ("CFO") valve 136 is capable of redirecting the constant flow of hydraulic fluid is provided in FIGS. 2A, 2B, and 2C. There, spool 118 is capable of providing selective hydraulic communication with either of a pair of hydraulic ports 122 and 124, depending upon the position of spool 118. The hydraulic ports 122 and 124 are hydraulically connected to a cylinder 126 on either side of a piston 128. The simple CFO valve 136 has a number of internal hydraulic pathways which permit the spool 118, depending on its position, to direct hydraulic fluid flow to or from hydraulic ports 122 and 124.

For example, in FIG. 2A, the spool 118 is in the neutral position. In that position, fixed displacement pump 116 pumps hydraulic fluid at a constant rate through open center core 130. The spool 118 does not obstruct or restrict the hydraulic fluid flow through the open center core 130, which proceeds to the tank galley 132, and then through tank galley 132 to hydraulic fluid tank 112. The spool 118 in the neutral position blocks the flow of hydraulic fluid to or from hydraulic ports 122 and 124, on the one hand, and either the open center core 130 or the tank galley 132, on the other hand. The result is that no net hydraulic fluid flows into or out of cylinder 126 either above or below piston 128. The piston 128 and associated load 134 do not raise or lower.

In FIG. 2B, on the other hand, spool 118 is caused to move to a first non-neutral position (upward) where spool 118 partially restricts the hydraulic fluid flow provided by fixed displacement pump 116 through open center core 130, raising the hydraulic pressure of the hydraulic fluid upstream of the spool 118 (i.e., between the spool 118 and the fixed displacement pump 116). The spool 118 also opens a hydraulic pathway within the simple CFO valve 136 for net hydraulic fluid to flow from the open center core 130 through hydraulic port 122 into the cylinder 126 below the piston 128. At the same time, spool 118 opens a hydraulic pathway in simple CFO valve 136 between hydraulic port 124 and the tank galley 132 allowing net hydraulic fluid to flow out of the cylinder 126 above the piston 128 to the tank galley 132 and to hydraulic fluid tank 132. The result is that there is net hydraulic fluid flow into the cylinder 126 below the piston 128 and out of the cylinder 126 above the piston 128; thus, the piston 128 and its associated load 134 is caused to rise.

Further, in FIG. 2C, spool 118 is caused to move to a second non-neutral position (downward), causing spool 118 to partially restrict the hydraulic fluid flow provided by fixed displacement pump 116 through open center core 130, raising the hydraulic pressure upstream of the spool 118. The spool 118 opens a hydraulic pathway within the simple CFO valve 136 permitting net hydraulic fluid flow from the open center core 130 through hydraulic port 124 into the cylinder 126 above the piston 128, while at the same time opening a hydraulic pathway between hydraulic port 122 and tank galley 132 allowing net hydraulic fluid to flow out of the cylinder 126 below the piston 128. The result is that the piston 128 and its associated load 134 are lowered.

The operation of the spool 118 in the system 110 is similar to the operation of the spool 118 in the simple CFO valve 136 described above; however, as illustrated and disclosed in the schematic diagram of FIG. 1, the fluid pathways within open center hydraulic valve system 110 that are selectively interconnected by spool 118 differ to a certain extent.

Referring once again to the open center hydraulic valve system 110 illustrated in FIG. 1, each spool 118 is capable of selective hydraulic communication with a pair of associated hydraulic ports 122 and 124. Each pair of hydraulic ports 122 and 124, in turn, may communicate hydraulically with equipment applications (such as a boom on a backhoe) in which the open center hydraulic valve system 110 is used to operate, typically utilizing a cylinder and a piston. The hydraulic ports selectively provide pressurized hydraulic flow to or from the cylinder on either side of the piston.

Referring again to FIG. 1, each spool 118 of each valve 114, and, hence, each pair of hydraulic ports 122 and 124 associated with each spool 118, is associated with a function of the application on the equipment within which the open center hydraulic valve system 110 is utilized. In the example illustrated in FIG. 1, one of the spools 118 (and the associated pair of ports 122 and 124) is associated with the each of the following functions, which can be found, for example, in a backhoe: boom, bucket, stick, swing, stabilizer, boom loader, bucket loader, and auxiliary. Those functions are chosen for purposes of illustration, and, as would be recognized by skilled practitioners, those functions can vary, depending on the equipment and applications to which the open center hydraulic valve system 110 is assigned.

The valves 114 include several hydraulic fluid pathways that may be selectively interconnected by activation of the spool 118, including an open center core 130, a power core 138, and a tank galley 132. The fixed displacement pump 116 pumps hydraulic fluid (at a constant flow rate for a given engine speed) from the hydraulic fluid tank 112 into the open center core 130. The tank galley 132 returns hydraulic fluid to the hydraulic fluid tank 112, where it is available to be re-pumped. The valves 114 also include a hydraulic connection between the open center core 130 and the power core 138, namely, an open center/power core passage 140 within the valve. Typically, the valves 114 may also include smaller internal valves utilized to prevent, for example, overpressure or incorrect flow direction in the system, such as relief valves 142, or load drop check valves 144, which are understood by those having skill in the art, and are not discussed fully for the sake of brevity.

The open center hydraulic valve system 110 is typically housed in a standard manifold (not illustrated) attached to the equipment (e.g., construction, earth moving, or forestry equipment, such as a backhoe) in which the open center hydraulic valve system 110 is being used. The fixed displacement pump 116 is typically driven by a power take-off (not illustrated), which, in turn, is directly mounted to a transmission (not illustrated), which is connected to the prime mover (for example, an internal combustion engine) of the equipment in which the open center hydraulic valve system 110 is being used.

The operation of the spools 118 in each of the valves 114 to direct hydraulic fluid flow to and to permit fluid flow from associated hydraulic ports 122 and 124 to cause, for example, a piston to move within a cylinder and thereby cause movement of a functional aspect of the equipment on which the open center hydraulic valve 110 is mounted, is well-known to skilled practitioners, and can be ascertained by skilled practitioners by reference solely to the schematic diagram found in FIG. 1. For purposes of the following explanation, hydraulic ports 122 and 124 will be assumed to be hydraulically connected to a cylinder 126 above and below a piston 128, respectively, in a manner similar to that illustrated in FIGS. 2A, 2B, and 2C.

As can be seen in FIG. 1, and will be described further below, when a spool 118 is caused by spool actuator 120 to be in the neutral position (with the open center core 130 unrestricted by the spool 118, and the fluid passageways between either the open center core 130 or the tank galley 132, on the one hand, and the pair of hydraulic ports 122 and 124 associated with the spool 118, on the other hand, being obstructed by the spool 118, no net hydraulic fluid flows to or from the hydraulic ports 122 and 124 to the cylinder 126 on either side of the piston 128, and thus, the piston 128 does not move. Instead, the hydraulic fluid delivered at a constant flow rate (for a given engine speed) by the fixed displacement pump 116 flows unrestricted through the open center core 130 and through the open center of the spools 118 to the tank galley 132 and to the hydraulic fluid tank 112 where it is re-pumped. Hence, the function to which the piston 128 and cylinder 126 is associated (e.g., the position of the boom) does not change, because there is no net change in hydraulic fluid in the cylinder 126 either above or below the piston 128. The piston 128 therefore does not move.

If, as shown in FIG. 1, the spool actuator 120 is activated by an operator to cause the spool 118 to move from the neutral position to a first non-neutral position, the constant flow of hydraulic fluid delivered by the fixed displacement pump 116 is caused by the partial restriction by the spool 118 of the open center core 130 to increase in pressure. Referring to FIG. 1, the increase in fluid pressure in the open center core 130 is communicated to the power core 138 through the open center/power core passage 140. As shown in FIG. 1, the activated spool 118 allows pressurized hydraulic fluid to flow from the power core 138 to the first hydraulic port 122 associated with the activated spool 118 into the cylinder 126 under the piston 128. The activated spool 118 simultaneously allows fluid to flow out of the cylinder 126 through the second hydraulic port 124 associated with the activated spool 118 which is connected above the piston 128. That fluid flows through the tank galley 132 to the hydraulic fluid tank 112 (where it is re-pumped). Thus, the net effect is that hydraulic fluid under pressure flows into the cylinder 126 below the piston 128, and hydraulic fluid flows out of the cylinder 126 above the piston 128. This causes the piston 128 and associated load 134 to rise and the function to change (e.g., it causes the boom and any associated load to rise).

On the other hand, if, as shown in FIG. 1, the spool operator manipulates the actuator 120 to cause the spool 118 to move from the neutral position to a second non-neutral position, that once again causes partial restriction of the open center 130, and causes the fluid flowing through the open center core 130 to increase in pressure. That increase in hydraulic pressure is once again communicated from the open center core 130 to the power core 138 through open center/power core passage 140. At the same time, hydraulic fluid is allowed by the activated spool 118 to flow out of the cylinder 126 under the piston 128 through the connected hydraulic port 122 associated with activated spool 118 and through the tank galley 132 to the hydraulic fluid tank 112. Also at the same time, the spool directs pressurized fluid (under pressure from the fixed displacement pump 116 due to partial restriction of the opening in the open center core 130 by the spool 118) to flow from the power core 138 through the associated hydraulic port 124 into the cylinder 126 above the piston 128. Thus, hydraulic fluid under pressure is introduced to the cylinder 126 above the piston 128, and hydraulic fluid is drained from the cylinder 126 below the piston 128. This causes the piston 128 to lower and the equipment function to change (e.g., the boom and any associated load is caused to lower). A skilled artisan would recognize, of course, that this activation of spools 118 in the valves 114 can be utilized to operate a number of different equipment functions having moving components, and would not be limited to booms (or to backhoes).

Further details of the operation of the open center hydraulic valve system 110 illustrated in FIG. 1 are described below. The explanation herein concerning the operation of a single spool 118 (and its associated pair of hydraulic ports 122 and 124) within a single valve 114 associated with a particular single function is illustrative, and is not limited to that particular single spool 118 or valve 114, and applies to other spools 118 and valves 114 within the open center hydraulic valve system 110 as well.

Because the pump for the open center hydraulic system 110 is a fixed displacement pump 116, the flow of the hydraulic fluid supplied by the fixed displacement pump 116 is constant for a given engine speed for the equipment in which the system 110 is mounted.

When the spool actuators 120 in the valves 114 in the open center hydraulic system 110 are in the neutral position, all of the associated spools 118 are likewise in the neutral position. As illustrated in FIG. 1, the centers of the valve spools 118 are open, the net flow paths to the associated hydraulic ports 122 and 124 (from the open center core 130 or the power core 138), or from the hydraulic ports 122 and 124 (to the tank galley 132), are blocked by the spools 118, and all net hydraulic fluid flow pumped by the fixed displacement pump 116 from the hydraulic fluid tank 112 at a constant flow rate flows unrestricted through the open center core 130 through the spools 118 to the tank galley 132 and then back to the hydraulic fluid tank 112 where it is again available to be pumped.

When one of the functions associated with the open center hydraulic system 110 is desired to be activated, the spool actuator 120 associated with that function is activated by an equipment operator in order to move the associated spool 118 (left or right, as shown in the schematic in FIG. 1) in order to partially restrict or "pinch" the opening through the open center core 130 to the tank galley 132. This partial restriction of hydraulic fluid flow by the spool 118 in the open center core 130 partially restricts flow to the tank galley 132, and, in turn, increases the pressure of the hydraulic fluid in the open center core 130 being provided at constant flow by the fixed displacement pump 116. The resulting increased hydraulic fluid pressure in the open center core 130 is transmitted hydraulically through the open center/power core passage 140 to the power core 138.

If the chosen spool actuator 120 is activated with the intention of causing the piston 128 to move to a first non-neutral position as illustrated in FIG. 1 (and to thereby, for example, lift a boom and associated load), then not only is the open center core 130 partially restricted to cause an increase in pressure to occur in the open center core 130 and be transmitted to the power core 138, but the spool 118 at the same time opens a hydraulic passage in the valve 114 between associated hydraulic port 122 (hydraulically connected to a cylinder 126 below the piston 128, in the manner illustrated in FIG. 2B) and the power core 138. The hydraulic fluid, having increased hydraulic pressure in the power core 138, is transmitted through associated hydraulic port 122. Simultaneously, activated spool 118 opens a hydraulic passage in the valve 114 between associated hydraulic port 124 (hydraulically connected to a cylinder 126 above the piston 128, in the manner illustrated in FIG. 2B) and the tank galley 132. The result is that hydraulic fluid under pressure from the power core 138 flows through associated hydraulic port 122 and begins filling the cylinder 126 below the piston 128, and hydraulic fluid is permitted to leave the cylinder 126 above the piston 128 by flowing through associated hydraulic port 124 into the tank galley 132 to return to the hydraulic fluid tank 112, where it is available to be re-pumped. By adding pressurized hydraulic fluid to the cylinder 126 below the piston 128, and by reducing hydraulic fluid in the cylinder 126 above the piston 128, the piston 128 and its associated load 134 is lifted.

Conversely, if the chosen spool actuator 120 is activated with the intention of causing the piston to move to a second non-neutral position as illustrated in FIG. 1, (and to, for example, cause a boom to lower), then not only does the activated spool 118 cause the open center core 130 to be partially restricted to cause an increase in fluid pressure in the open center core 130 to be hydraulically transmitted to the power core 138 via open center/power core passage 140, but also the activated spool 118 opens a hydraulic passage in the valve 114 between the associated hydraulic port 124 (hydraulically connected to cylinder 126 above the piston 128) and the power core 138 (with pressurized hydraulic fluid). Simultaneously, the activated spool 118 opens a passage in valve 114 between associated hydraulic port 122 (hydraulically connected to cylinder 126 below the piston 128, in the manner illustrated in FIG. 2C) and the tank galley 132, allowing hydraulic fluid to flow out of the cylinder 126 below the piston 128 to the tank galley 132 and the hydraulic fluid tank 112. The result is that hydraulic fluid under pressure from the power core 138 begins filling the cylinder 126 above the piston 128, and hydraulic fluid begins leaving the cylinder 126 below the piston 128. The piston 128 and its associated load 134 lowers (in this example, the boom and load is lowered).

Because the open center hydraulic valve system 110 illustrated in FIG. 1 utilizes a fixed displacement pump 116 operating at a constant flow for a given engine speed for the equipment on which it is mounted, all power used to generate unused hydraulic fluid flow (such as hydraulic fluid constantly flowing through the open center core 130 when the spools 118 are in the neutral position) is a loss. Nevertheless, the size and power of the fixed displacement pump 116 in such a system must accommodate not only sufficient hydraulic flow and system pressure to operate the multiple functions operated by the valves 114 at rated load conditions, but also must sustain the constant hydraulic flow through the open center core 130 (as well as overcome line losses) in order for the system to operate properly. A relatively large and powerful fixed displacement pump 116 running constantly is therefore required for the open center hydraulic valve system 110. And, as noted above, a considerable portion of the power of the fixed displacement pump 116 in such a system is required to deliver hydraulic fluid flow that is frequently unused by the functions of the system, for example, the unused flow that constantly passes through the open center core 130 to the hydraulic fluid tank 112, only to be re-pumped (when one or more, often all, spools 118 are not activated and the functions are idle). Hence, significant inefficiencies are inherent in the open center hydraulic valve system 110.

A number of factors have spurred equipment manufacturers and hydraulic systems designers to attempt to overcome the inefficiencies and shortcomings of the hydraulic valve systems, including open center hydraulic valve system 110. New emissions standards and a desire for fuel savings have caused designers and manufacturers to attempt to design equipment and hydraulic systems that are more fuel efficient, and more power efficient, by achieving greater horsepower management. Manufacturers and designers likewise desire to avoid significant increases in the size, weight, and expense of providing alternatives to the prior art systems. Since the pump of the system 110 described above is fixed, the whole pump flow is always pressurized at the highest function pressure. Throttling losses in the valve, especially at low flow demand (i.e. during slow movements), can be substantial.

One potential alternative is to replace the fixed displacement pump 116 of the open center hydraulic valve system 110 illustrated in FIG. 1 with a variable displacement piston pump. In such a potential alternative, however, the existing valves 114 in the open center hydraulic valve system 110 would be required to be replaced by considerably larger, considerably heavier, and considerably more expensive valves in order to permit the higher hydraulic fluid flow required by such a replacement. Such a potential alternative would be cost prohibitive, and the installation of such a large, heavy system would be highly undesirable because, in many if not most applications, there is limited room available on equipment for the hydraulic system to be mounted.

Competing load sense technology uses variable pumps to adjust the pump flow to function demand, but loses the pressure dependency of the speed of the movement; therefore the operator no longer get any feedback on the forces at the implement.

The invention combines the advantages of conventional CFO systems with the advantages of load sense systems.

Figure 3:
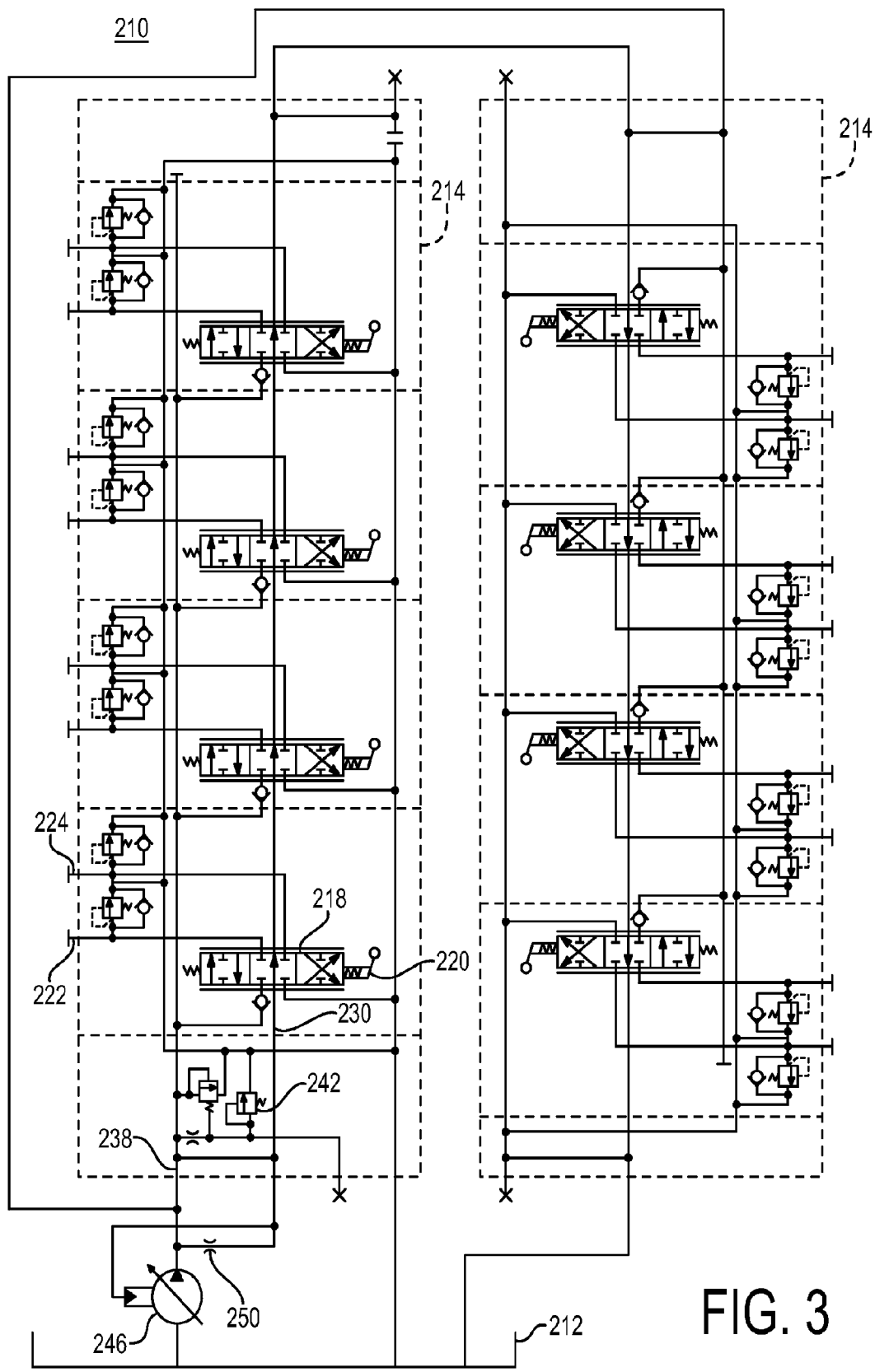
FIG. 3 shows a schematic drawing of an exemplary load sense open center hydraulic system having a fixed metering device.
Figure 4:
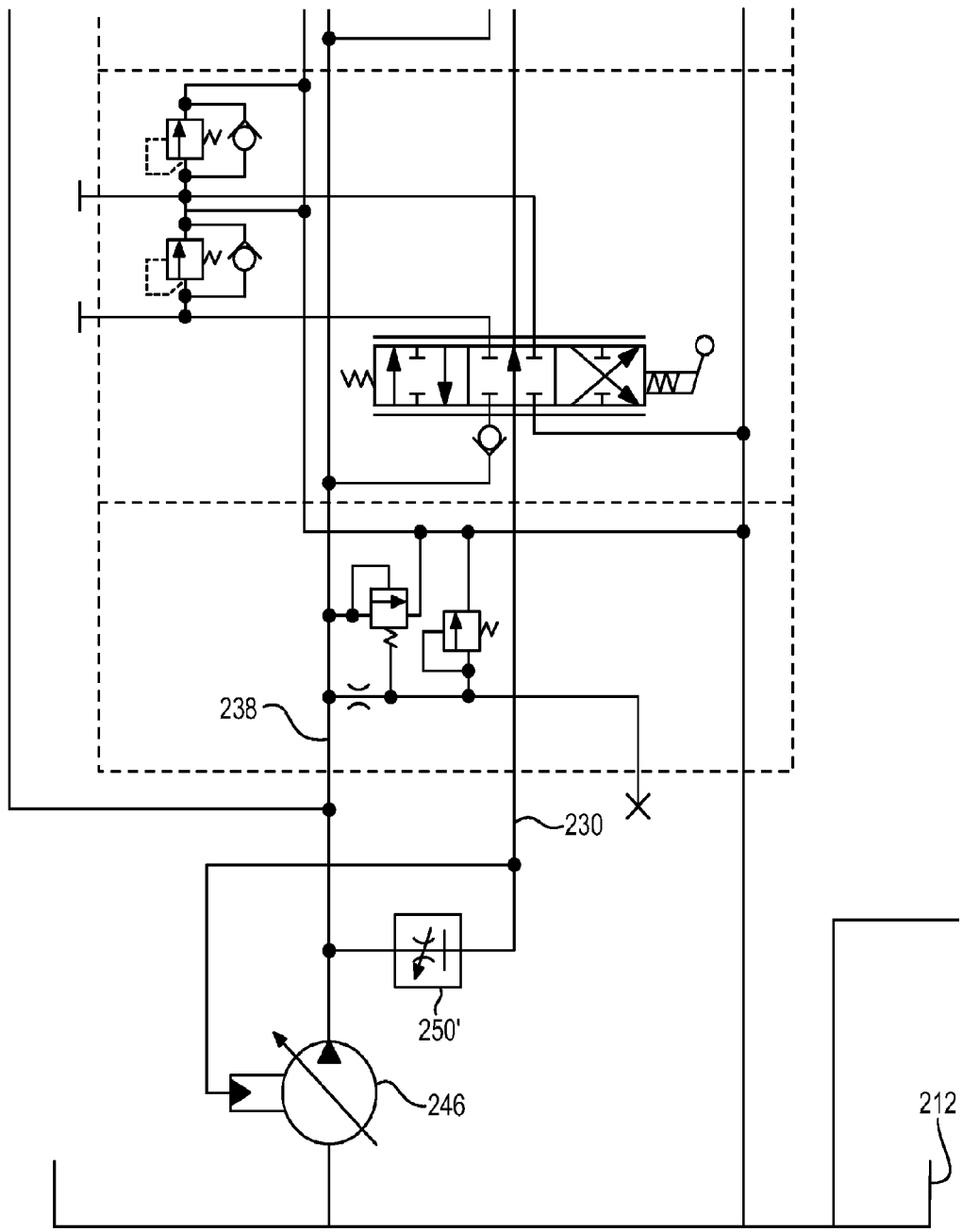
FIG. 4 shows a detail view of an exemplary load sense open center hydraulic system having a pressure compensated flow control metering device.

An exemplary hydraulic system 210 is illustrated schematically in FIGS. 3 and 4 in a manner using schematic symbols that would be understood by persons skilled in the art. The hydraulic system 210 shares similarities with the above-referenced system 110, and consequently the same reference numerals but indexed by 100 are used to denote structures corresponding to similar structures in the system. In addition, the foregoing description of the system 110 is equally applicable to the system 210 except as noted below. Moreover, it will be appreciated upon reading and understanding the specification that aspects of the systems may be substituted for one another or used in conjunction with one another where applicable.

The exemplary hydraulic system 210 includes a hydraulic fluid tank 212, and one or more standard open center hydraulic valve banks 214 modified in the manner described and illustrated herein ("fixed/variable valves"). Each fixed/variable valve 214 may include one or more spools 218, each activated by an associated spool actuator 220. As previously discussed, the spool actuator 220 may be activated by an operator using a variety of known means, including mechanically, electrically, hydraulically, pneumatically, or otherwise.

In the exemplary hydraulic system 210, the fixed displacement pump of the system 110 is replaced by a variable capacity (e.g., variable displacement piston type) load sense type pump 246.

The system 210 of the present invention may be housed in a standard manifold (not illustrated) attached to the equipment (e.g., off-road construction, earth moving, or forestry equipment—not illustrated) in which the system 210 is being used. The variable displacement pump 246 may be driven by a power take-off (not illustrated), which, in turn, is mounted to a transmission (not illustrated) connected to the prime mover of the equipment.

Each spool 218 of the system 210 operates in the same manner as described above for spools 118 in the conventional open center hydraulic valve system 110 to provide selective hydraulic communication with hydraulic ports 222 and 224 associated with each spool 218. In a typical application of the invention, each pair of hydraulic ports 222 and 224 communicate hydraulically with a cylinder on opposite sides of a piston to cause piston movement, in a manner similar to that described above for the open center hydraulic valve system 110. In order to prevent undue repetition, to serve the function of brevity, and to avoid belaboring what is known to skilled practitioners in the art, the operation of the hydraulic ports 222 and 224 hydraulically connected to a cylinder on either side of a load-supporting piston in the fixed/variable hybrid system 210 is the same as explained and illustrated for hydraulic ports 122 and 124 hydraulically connected to the cylinder 126 on either side of piston 128, and load 134 in the prior art open center hydraulic valve system 110 previously described and illustrated (see, e.g., FIGS. 1, 2A, 2B, and 2C) except as noted herein.

The variable capacity pump is tied directly only to the CFO valve's parallel power core. The CFO valve is configured without any connection or passageway between the power core and open center core. The CFO valves open center passageway is also supplied with flow from the load sense pump, but indirectly through a fixed or variable (to easily adjust the control gains) metering device 250. This may be, for example, a pressure compensated flow control. As a load sense pump works to maintain a set pressure differential between its outlet port and its load sense signal port, a constant, yet small, amount of flow is allowed to pass through the CFO open center passageway. This amount is a signal flow and is small compared to the amount passing through the parallel power core, for example, less than about 30% of main flow. Preferably, the signal flow is about 1-10 liters per minute versus.

The metering device, for example the pressure compensated flow control 250' as shown in FIG. 4, is set to allow a constant, yet small, amount of flow to pass through the CFO open center passageway. The notches of the valve spools restricting the flow through the open center passageway are cut specifically to create a restriction in the open center passageway so that the pressure in the open center passageway increases with spool stroke. The notches in the open center are substantially smaller than the parallel power core notches to provide the reduced signal flow, and are preferably less than 10%, and more preferably about 1-4% the size of the parallel power core notches.

As the load sense line of the load sense pump is connected to the open center passageway as well, any spool stroke increases the pressure command to the load sense pump. The load sense pump's control will change its displacement to match the pressure in the load sense line plus a certain margin pressure at its outlet port. (That is, unless the load sense pump is saturated, i.e. required to provide more flow than possible at maximum displacement.)

The flow for the individual functions is then determined by the design of the spools in the parallel power core, the load pressure for the individual functions and the spool position of all sections providing an operator experience very similar to the open center 'feel'. However since the variable pump adjusts its displacement automatically to provide just the required pressure created by the restriction in the open center passageway, no excess flow is wasted.

Figure 5:
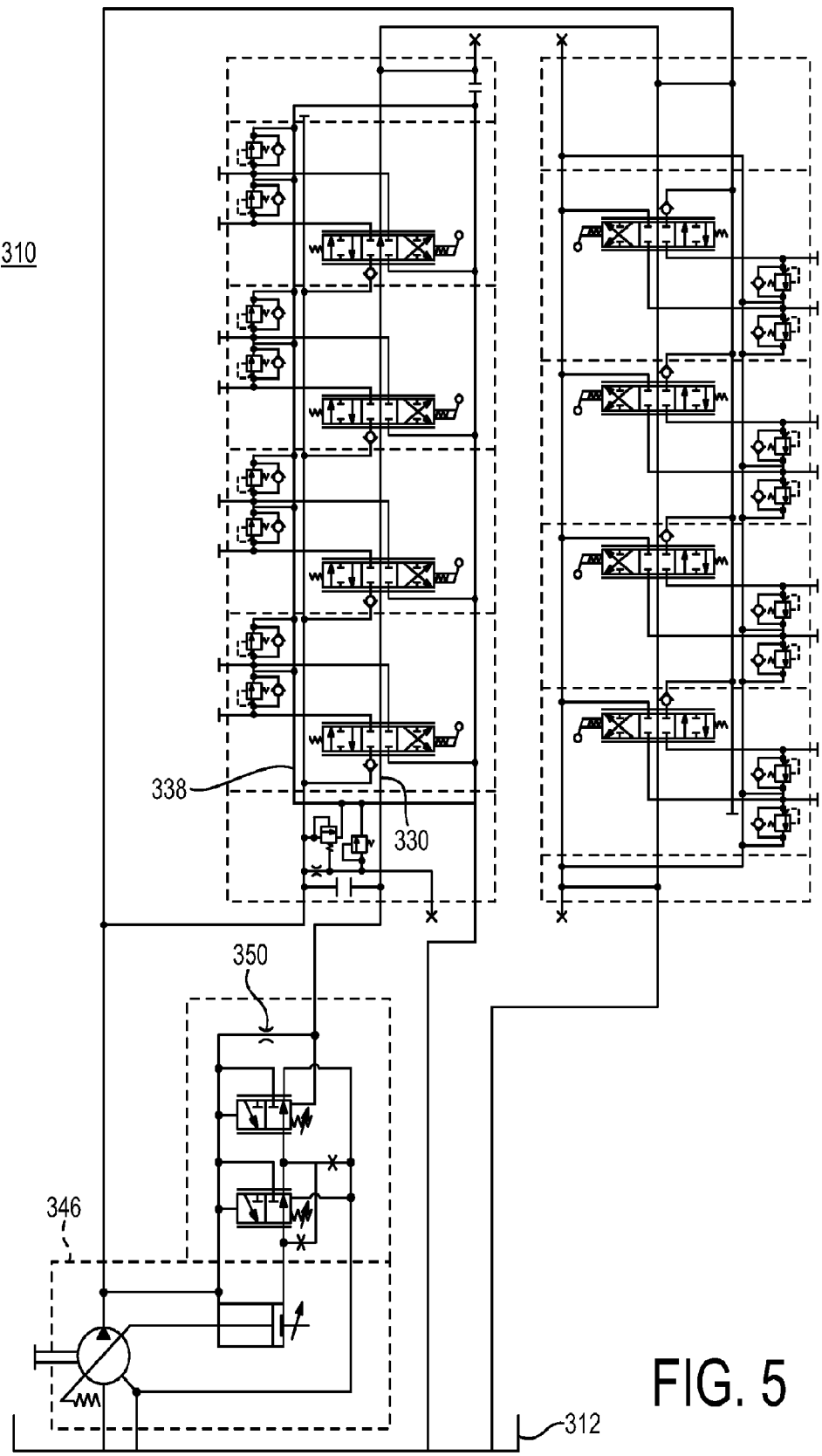
FIG. 5 shows a schematic drawing of an exemplary open center hydraulic system having a remote pressure controlled pump.

Turning now to FIG. 5, an exemplary embodiment of the hydraulic system is shown at 310. The system 310 is substantially the same as the above-referenced system 210, and consequently the same reference numerals but indexed by 100 are used to denote structures corresponding to similar structures in the system. In addition, the foregoing description of the system 210 is equally applicable to the system 310 except as noted below. Moreover, it will be appreciated upon reading and understanding the specification that aspects of the systems may be substituted for one another or used in conjunction with one another where applicable.

The same or similar functionality as described above with reference to the system 210 can also be achieved by using a pump set up as a remote pressure control pump as shown in FIG. 5.

Figure 6:
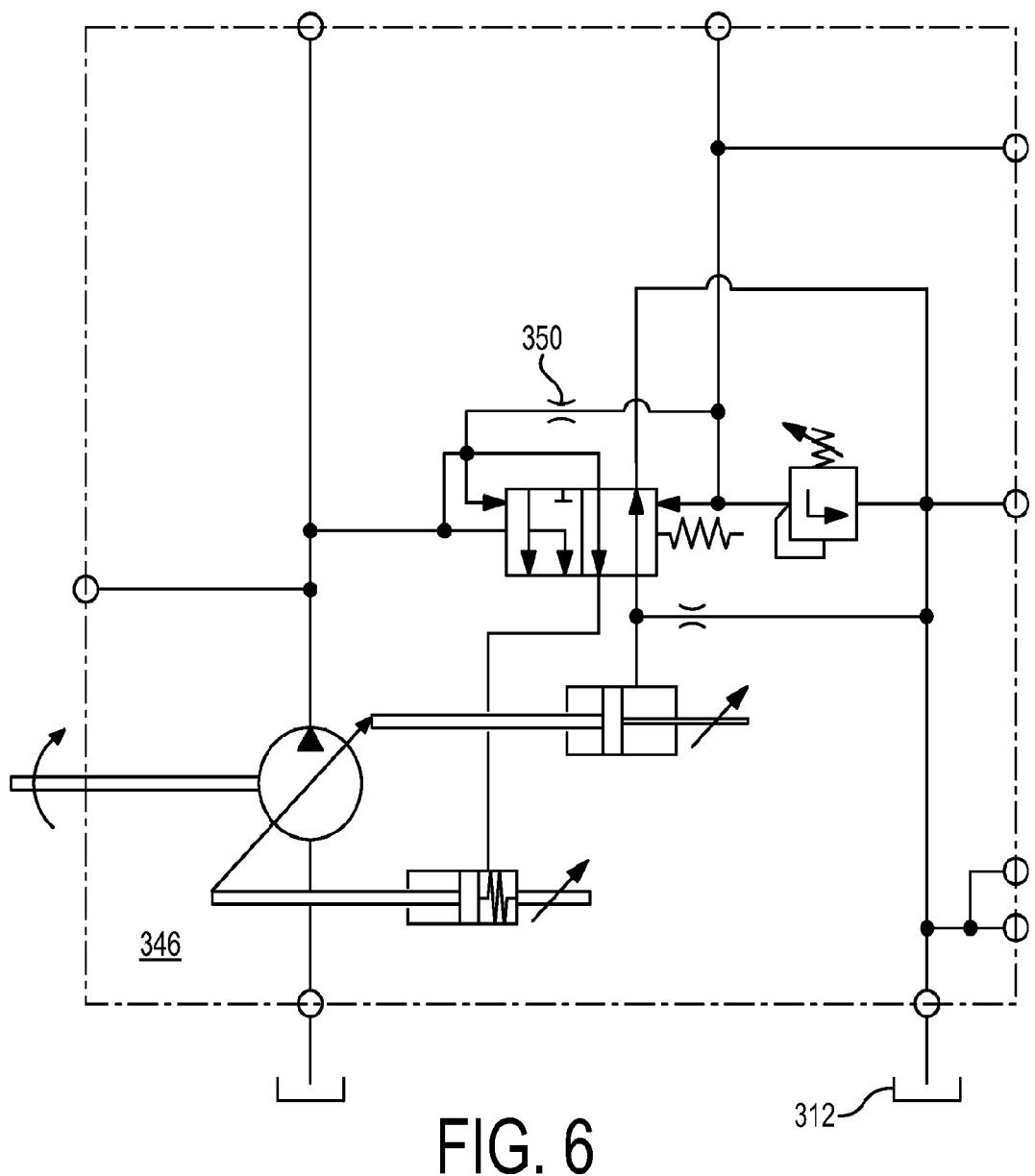
FIG. 6 shows a detail schematic view of a remote pressure controlled pump.

In particular, FIG. 6 shows an example of a schematic of this control option operable with most variable pumps. As shown, a small orifice 350 is integrated into the pump supplying flow to the control port (V), which may be connected to the open center passageway of the CFO valve. In this case, no external metering device needs to be plumbed into the circuit.

As the signal line of the remote pressure controlled pump 346 is connected to the open center passageway as well, any spool stroke increases the pressure command to the remote pressure controlled pump. The remote pressure controlled pump's control will change its displacement to match the pressure in the signal line at its outlet port. (That is, unless the pump is saturated, i.e. required to provide more flow than possible at maximum displacement.)

As with the load sense system 210, since the remote pressure controlled pump adjusts its displacement automatically to provide just the required pressure created by the restriction in the open center passageway, no excess flow is wasted.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A valve assembly comprising:
    one or more constant-flow, open center valves;
    an open center valve input port;
    a parallel power core operatively coupled to the one or more constant-flow, open center valves;
    a power core input port separate from the open center valve input port;
    a variable capacity pump fluidly connected to the parallel power core input port and the open center valve input port; and
    a flow restrictor fluidly connected between the variable capacity pump and the one or more constant-flow, open center valves,
    wherein the parallel power core is not fluidly connected to an open center core of the open center valves downstream of the input ports,
    wherein a smaller flow passes through the open center valve input port than through the parallel power core, and
    wherein at least one of the one or more constant-flow, open center valves includes a valve spool having open center notches and power core notches, the open center notches being substantially smaller than the power core notches,
    the valve assembly further comprising:
    a signal port associated with the variable capacity pump, wherein an increase in hydraulic fluid pressure received by the signal port cause the variable displacement pump to pump hydraulic fluid at an increased pressure rate, and wherein a decrease in hydraulic fluid pressure received by the signal port causes the variable displacement pump to pump hydraulic fluid at a decreased pressure rate;
    a sense signal passage hydraulically connecting the open center core and the signal port, wherein the hydraulic connection between the sense signal passage and the open center core is located between the pump and the spool of the first one of the one or more constant-flow, over center valves downstream of the pump in the open center core;
    wherein when activation of one or more of the spools of one or more of the constant-flow, over center valves occurs in a manner causing one or more of the activated spools to be in either a first non-neutral position, or a second non-neutral position, increased hydraulic fluid pressure in the open center core is hydraulically communicated through the sense signal passage to the signal port.

2. The valve assembly of claim 1, wherein flow through the open center valve input port is less than about 30% of flow through the parallel power core.

3. The valve assembly of claim 1, wherein the variable capacity pump is directly fluidly connected to the parallel power core input port.

4. The valve assembly of claim 1, wherein the flow restrictor is a pressure compensated flow control fluidly connected between the variable capacity pump and the one or more constant-flow, open center valves.

5. The valve assembly of claim 1, wherein the one or more constant-flow, open center valves include a plurality of serially connected constant-flow, open center valves.

6. The valve assembly of claim 1, wherein the pump is a load-sense pump.

7. The valve assembly of claim 1, wherein the pump is set up as a remote pressure control pump.

8. The valve assembly of claim 1, wherein the flow restrictor is a fixed metering device.

9. The valve assembly of claim 1, wherein the flow restrictor is a variable metering device.

10. The valve assembly of claim 1, wherein the open center notches are configured to create a flow restriction such that the pressure in the open center passageway increases with spool stroke.

11. The valve assembly of claim 1, wherein the open center notches are less than 10% the size of the power core notches.

12. The valve assembly of claim 11, wherein the open center notches are about 1-4% the size of the power core notches.

13. The valve assembly of claim 1, wherein each spool in each of the one or more valves has associated therewith a spool activator, wherein each of said spool activators is capable of causing movement of the spool associated therewith to either a neutral position, a first non-neutral position, or a second non-neutral position.

14. A valve assembly comprising:
one or more constant-flow, open center valves;
an open center valve input port;
a parallel power core operatively coupled to the one or more constant-flow, open center valves;
a power core input port separate from the open center valve input port;
a variable capacity pump fluidly connected to the parallel power core input port and the open center valve input port; and
a flow restrictor fluidly connected between the variable capacity pump and the one or more constant-flow, open center valves,
wherein the parallel power core is not fluidly connected to an open center core of the open center valves downstream of the input ports,
wherein a smaller flow passes through the open center valve input port than through the parallel power core,
wherein at least one of the one or more constant-flow, open center valves includes a valve spool having open center notches and power core notches, the open center notches being substantially smaller than the power core notches, and
wherein the one or more constant-flow, open center valves are not fluidly coupled to a fixed capacity pump.

15. The valve assembly of claim 14, further comprising:
a signal port associated with the variable displacement pump, wherein an increase in hydraulic fluid pressure received by the signal port cause the variable displacement pump to pump hydraulic fluid at an increased pressure rate, and wherein a decrease in hydraulic fluid pressure received by the signal port causes the variable displacement pump to pump hydraulic fluid at a decreased pressure rate;
a sense signal passage hydraulically connecting the open center core and the signal port, wherein the hydraulic connection between the sense signal passage and the open center core is located between the pump and the spool of the first one of the one or more valves downstream of the pump in the open center core;
wherein when activation of one or more of the spools of one or more of the valves occurs in a manner causing one or more of the activated spools to be in either a first non-neutral position, or a second non-neutral position, increased hydraulic fluid pressure in the open center core is hydraulically communicated through the sense signal passage to the signal port.

16. A valve assembly comprising:
one or more constant-flow, open center valves;
an open center valve input port;
a parallel power core operatively coupled to the one or more constant-flow, open center valves;
a power core input port separate from the open center valve input port;
a variable capacity pump fluidly connected to the parallel power core input port and the open center valve input port; and
a flow restrictor fluidly connected between the variable capacity pump and the one or more constant-flow, open center valves,
wherein the parallel power core is not fluidly connected to an open center core of the open center valves downstream of the input ports,
wherein a smaller flow passes through the open center valve input port than through the parallel power core,
wherein at least one of the one or more constant-flow, open center valves includes a valve spool having open center notches and power core notches, the open center notches being substantially smaller than the power core notches, and
wherein the valve spool has associated therewith:
(A) a first hydraulic port and a second hydraulic port;
(B) a first spool passage between the parallel power core and a first hydraulic port associated with the spool, that is capable of being opened or closed depending upon the position of the spool;
(C) a second spool passage between the parallel power core and a second hydraulic port associated with the spool, that is capable of being opened or closed depending upon the position of the spool;
(D) a third spool passage between a tank galley and the first hydraulic port associated with the spool, that is capable of being opened or closed depending upon the position of the spool;
(E) a fourth spool passage between the tank galley and the second hydraulic port associated with the spool, that is capable of being opened or closed depending upon the position of the spool;
(F) a fifth spool passage, wherein an open center core passes through the fifth spool passage, and wherein, depending upon the position of the spool, the spool may permit hydraulic fluid to flow through the fifth spool passage and the open center core in an unrestricted manner, or the spool may partially restrict the hydraulic fluid flowing through the fifth spool passage and the open center core.

17. The valve assembly of claim 13, wherein the spool has at least a neutral position, a first non-neutral position, and a second non-neutral position, wherein:
(A) in the neutral position, the spool permits hydraulic fluid to flow through the fifth spool passage and the open center core passing therethrough in an unrestricted manner, and the spool blocks the flow of hydraulic fluid through the first spool passage, the second spool passage, the third spool passage, and the fourth spool passage,
(B) in the first non-neutral position, the spool partially restricts the flow of hydraulic fluid through the fifth spool passage and the open center core passing therethrough, the spool opens the first spool passage between the power core and the first hydraulic port associated with the spool allowing hydraulic fluid to flow from the power core to the first hydraulic port, the spool opens the fourth spool passage between the tank galley and the second hydraulic port associated with the spool allowing hydraulic fluid to flow from the second hydraulic port to the tank galley, the spool closes the second spool passage between the power core and the second hydraulic port associated with the spool, and the spool closes the third spool passage between the tank galley and the first hydraulic port associated with the spool; and (C) in the second non-neutral position, the spool partially restricts the flow of hydraulic fluid through the fifth spool passage and the open center core passing therethrough, the spool opens the second spool passage between the power core and the second hydraulic port associated with the spool allowing hydraulic fluid to flow from the power core to the second hydraulic port, the spool opens the third spool passage between the tank galley and the first hydraulic port associated with the spool allowing hydraulic fluid to flow from the first hydraulic port to the tank galley, the spool closes the first spool passage between the power core and the first hydraulic port associated with the spool, and the spool closes the fourth spool passage between the tank galley and the second hydraulic port associated with the spool.

* * * * *